W. H. GONNE.

Knob Attachment.

No. 9,101. Reissued Mar. 2, 1880.

Attest:
A. Waithel
Thos. S. Day

Inventor:
W. H. Gonne
By Atty
Thos. S. Sprague

N. PETERS, PHOTO-LITHOGRAPHER, WASHINGTON, D. C.

UNITED STATES PATENT OFFICE.

WILLIAM H. GONNE, OF CHATHAM, ONTARIO, CANADA.

KNOB ATTACHMENT.

SPECIFICATION forming part of Reissued Letters Patent No. 9,101, dated March 2, 1880.

Original No. 182,111, dated September 12, 1876. Application for reissue filed January 8, 1880.

*To all whom it may concern:*

Be it known that I, WILLIAM H. GONNE, of Chatham, county of Kent, Province of Ontario, Canada, have invented a new and Improved Door-Knob, of which the following is a specification.

Figure 1:
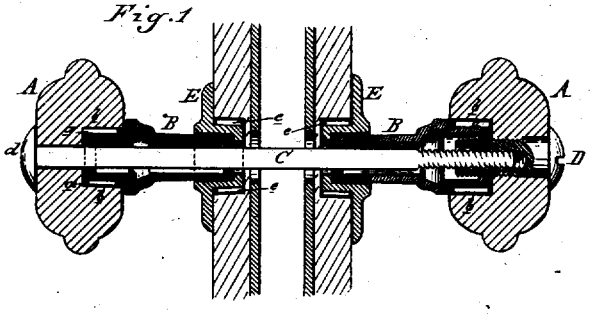
Figure 2:
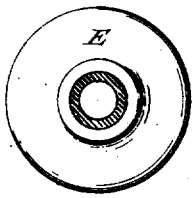
Figure 3:
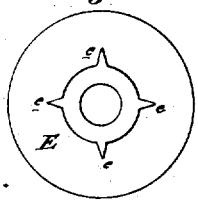
Figure 4:
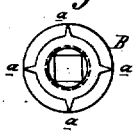

In the accompanying drawings, Figure 1 represents a vertical longitudinal section of my improved door-knob. Figs. 2 and 3 are, respectively, front and rear views of the knob-rose; and Fig. 4, an end view of the shank, to show attachment to knob.

Similar letters of reference indicate corresponding parts.

My invention has reference to improved door-knobs, which are strongly and substantially applied to doors and capable of adjustment to different thicknesses of the same.

My invention consists of a door-knob having an adjustable nut entering an orifice therein and screwing on the spindle, in combination with a shank loose on said spindle and screwing on the adjustable nut, as hereinafter more fully set forth.

In the drawings, A represents door-knobs of any suitable shape or size; B, the metallic or other shanks, that are made separate from the knobs, and seated, by means of ribs or flanges *a*, into grooved sockets *b* of the knobs, so that the same may not turn on the shanks. A spindle, C, with a head, *d*, at one end, passes through the knob and shank at one side of the door, then through the door and lock to the other side, and finally through the shank and knob at the other side, where it is firmly secured by a screw-nut, D, that screws in between the shank and spindle and on the spindle end, binding thereby the parts firmly together.

The shanks B turn in socket-recesses of the knob-roses E, which are driven into recesses of the door, and prevented from turning by means of outer projecting wings or ribs, *e*, on the sockets of the roses. The roses are thereby kept rigidly in place and admit the turning of the shanks and spindles.

The spindle and screw-nut connection of the knobs admits the ready adjustment of the knobs to any thickness of door and furnishes a substantial and durable knob attachment to doors.

Having thus fully described my invention, I claim as new and desire to secure by Letters Patent—

In a door-knob, an adjustable nut entering an orifice in the knob and screwing on the spindle in combination with a shank loose on said spindle, and screwing on the adjustable nut, substantially as described, and for the purpose set forth.

WILLIAM H. GONNE.

Witnesses:

H. S. SPRAGUE,

A. BARTHEL.